United States Patent
Chou

(10) Patent No.: US 11,125,222 B2
(45) Date of Patent: Sep. 21, 2021

(54) AIR COMPRESSOR

(71) Applicant: UNIK WORLD INDUSTRIAL CO., LTD., Tainan (TW)

(72) Inventor: Wen-San Chou, Tainan (TW)

(73) Assignee: UNIK WORLD INDUSTRIAL CO., LTD., Tainan (TW)

( * ) Notice: Subject to any disclaimer, the term of this patent is extended or adjusted under 35 U.S.C. 154(b) by 101 days.

(21) Appl. No.: 16/579,228

(22) Filed: Sep. 23, 2019

(65) Prior Publication Data

US 2020/0102953 A1    Apr. 2, 2020

(30) Foreign Application Priority Data

Sep. 28, 2018   (TW) .................................. 107134570

(51) Int. Cl.
| | |
|---|---|
| F04B 35/04 | (2006.01) |
| F04B 39/00 | (2006.01) |
| F04B 53/02 | (2006.01) |
| F04B 35/01 | (2006.01) |
| F04B 39/14 | (2006.01) |
| F04B 17/03 | (2006.01) |
| F04B 53/22 | (2006.01) |
| F04B 53/14 | (2006.01) |
| F16H 21/18 | (2006.01) |
| F16H 21/24 | (2006.01) |

(52) U.S. Cl.
CPC .............. *F04B 35/04* (2013.01); *F04B 17/03* (2013.01); *F04B 35/01* (2013.01); *F04B 39/0022* (2013.01); *F04B 39/0094* (2013.01); *F04B 39/14* (2013.01); *F04B 53/02* (2013.01); *F04B 53/14* (2013.01); *F04B 53/22* (2013.01); *F16H 21/18* (2013.01); *F16H 21/24* (2013.01)

(58) Field of Classification Search
CPC .......... F04B 35/01; F04B 35/04; F04B 17/03; F04B 39/14; F04B 39/0094; F04B 53/14; F04B 53/22; F04B 39/0022; F04B 53/02; F16H 21/18; F16H 21/24
See application file for complete search history.

(56) References Cited

U.S. PATENT DOCUMENTS

| | | | | |
|---|---|---|---|---|
| 4,551,074 A * | 11/1985 | Asaka | ...................... | F04B 35/04 417/366 |
| 6,095,758 A * | 8/2000 | Chou | ...................... | F04B 35/04 417/374 |
| 6,200,110 B1 * | 3/2001 | Chou | ...................... | F04B 35/04 417/415 |
| 6,655,928 B2 * | 12/2003 | Chou | ...................... | F04B 35/00 417/360 |

(Continued)

*Primary Examiner* — Christopher S Bobish

(57) ABSTRACT

An air compressor contains: a torque gear on which a central orifice and a connection rod are arranged. The central orifice has screw threads defined thereon and corresponds to one of multiple positioning orifices of a base, the one positioning orifice is configured to accommodate a bearing, and a screw bolt is inserted through the bearing in the base so as to screw with the central orifice via the torque gear. The connection rod of the torque gear is rotatably connected with a piston so that the piston moves in a cylinder to produce compressed air, the torque gear matingly contacts with the bearing along the screw bolt, and the bearing is not broken in the one positioning orifice, thus moving the piston in the cylinder reciprocately.

8 Claims, 10 Drawing Sheets

(56) References Cited

U.S. PATENT DOCUMENTS

| | | | | |
|---|---|---|---|---|
| 7,125,228 | B2* | 10/2006 | Dexter | B08B 3/026 |
| | | | | 417/299 |
| 7,273,358 | B2* | 9/2007 | Wang | F04B 35/04 |
| | | | | 417/360 |
| 7,462,018 | B2* | 12/2008 | Chou | F04B 35/04 |
| | | | | 417/415 |
| 9,011,118 | B2* | 4/2015 | Chou | F04B 35/01 |
| | | | | 417/545 |
| 9,441,619 | B2* | 9/2016 | Ito | F04B 53/006 |
| 9,945,369 | B2* | 4/2018 | Chou | F04B 39/0022 |
| 2002/0178907 | A1* | 12/2002 | Chou | F04B 35/01 |
| | | | | 92/140 |
| 2004/0105766 | A1* | 6/2004 | Chou | F04B 35/00 |
| | | | | 417/415 |
| 2005/0191193 | A1* | 9/2005 | Chou | F04B 35/04 |
| | | | | 417/437 |
| 2006/0245952 | A1* | 11/2006 | Chen | F04B 39/066 |
| | | | | 417/415 |
| 2007/0264139 | A1* | 11/2007 | Chou | F04B 39/0094 |
| | | | | 417/415 |
| 2013/0078119 | A1* | 3/2013 | Chou | F04B 35/04 |
| | | | | 417/374 |
| 2015/0059507 | A1* | 3/2015 | Hong | F16H 55/17 |
| | | | | 74/433.5 |

* cited by examiner

AIR COMPRESSOR

FIELD OF THE INVENTION

The present invention relates to an air compressor in which the torque gear engages with the bearing by using the screw bolt so that the bearing is not removed from the screw bolt, and the piston moves in the cylinder reciprocately when the air compressor operates.

BACKGROUND OF THE INVENTION

With reference to FIGS. 8-10, a conventional air compressor 1 contains a base 11, a cylinder 12 connected on the base 11, a motor 13 and a piston 14 which are both connected on the base 11, wherein the piston 14 is driven by the motor 13 to move reciprocately in the cylinder 12 so as to draw, compress, pressurize, and discharge air.

The motor 13 is actuated by a gear mechanism and a crank mechanism so as to drive the piston 14 to move reciprocately. The gear mechanism includes a drive gear 151 mounted on a central shaft of the motor 13, and the gear mechanism includes a driven gear 152 meshing with the drive gear 151. The crank mechanism includes a counterweight portion 161 connected on the driven gear 152, a connection rod 164 rotatably connected with the piston 14, and a post 162 extending from the counterweight portion 161, wherein the post 162 has a small-diameter segment and a large-diameter segment, and the crank mechanism further includes a stepped portion 165 defined between the small-diameter segment and the large-diameter segment of the post 162, a cutout 166 defined on the large-diameter segment of the post 162 which is arranged on the counterweight portion 161, and a threaded orifice 163 formed on the small-diameter segment of the post 162 which is accommodated in a receiving orifice 110 of the base 11, and the receiving orifice 110 also accommodates a bearing 111. The post 162 of the crank mechanism is locked in the bearing 111 by using a screw element 17, wherein the connection rod 164 is eccentric relative to the post 162. When the driven gear 152 is driven by the drive gear 151, the piston 14 is actuated to move in the cylinder 12 reciprocately.

After the piston 14, the driven gear 152, and the crank mechanism are connected, an angle θ is defined among the piston 14, the driven gear 152, the crank mechanism, and a top 112 of the base 11 so that the post 162 does not contact with the base 11, the piston 14 is pushed into the cylinder 12, the post 162 is guided into the bearing 111, and the post 162 is locked in the bearing 111 by ways of the screw element 17. The base 11 covers the bearing 111, i.e., the top 112 of the base 11 does not flush with an outer face 113 of the bearing 111 in the base 11, wherein a spacing between the top 112 of the base 11 and the outer face 113 of the bearing 111 is a first distance D, a thickness of the base 11 is a second distance E, and a spacing between the top 113 of the base 11 and the driven gear 152 is a third distance B. A spacing between the piston 14 and the top 112 is a fourth distance F, and a spacing between the piston 14 and the outer face 113 of the bearing 111 is the fourth distance F+the first distance D. When the piston 14 moves in the cylinder 12 reciprocately, a deformation causes in the cylinder 12 to reduce air compressing efficiency and a service life of the air compressor, because the base 11 is made of plastic material to soften in a high temperature. Furthermore, when the piston 14 moves reciprocately, it pulls the bearing 111 to remove the post 162 from or to cause an idle rotation of the post 162 in an internal ring of the bearing 111, thus deforming the receiving orifice 110 and the bearing 111. An inner wall of the receiving orifice 110 is fractioned by the driven gear 152 of the gear mechanism, and the piston 14 offsets in the receiving orifice 110, so the piston 14 cannot move vertically in the cylinder 12, and the receiving orifice 110 is broken by the post 162. The piston 14 deforms when moving in the cylinder 12 reciprocately.

The base 11 covers the bearing 111, and the spacing between the top 112 of the base 11 and the outer face 113 of the bearing 111 is the first distance D, so the thickness (i.e., the second distance E) of the base 11 cannot be reduced.

In addition, a torque from the piston 14 to the bearing 111 is equal to the fourth distance F+the second distance E, hence the torque cannot be decreased to lower the angle of the post 162, and a loading of the bearing 111 cannot be reduce, thus decreasing the service life of the bearing 111.

The present invention has arisen to mitigate and/or obviate the afore-described disadvantages.

SUMMARY OF THE INVENTION

The primary aspect of the present invention is to provide an air compressor in which the piston is rotatably connected with the connection rod of the torque gear, the piston is accommodated into the central orifice of the torque gear and corresponds to the internal ring of the bearing in the second positioning orifice of the base, and the screw bolt is screwed with the central orifice after being inserted through the internal ring of the bearing and the torque gear, such that when the air compressor operates, the torque gear engages with the bearing by using the screw bolt so that the bearing is not removed from the screw bolt, and the piston moves in the cylinder reciprocately.

Another aspect of the present invention is to provide an air compressor in which a spacing between the upper surface of the base and the toothed portion of the torque gear is a distance, wherein the distance is more than zero, such that the toothed portion does not friction with the upper surface of the base, when the torque gear rotates.

DETAILED DESCRIPTION OF THE PREFERRED EMBODIMENTS

Figure 1:
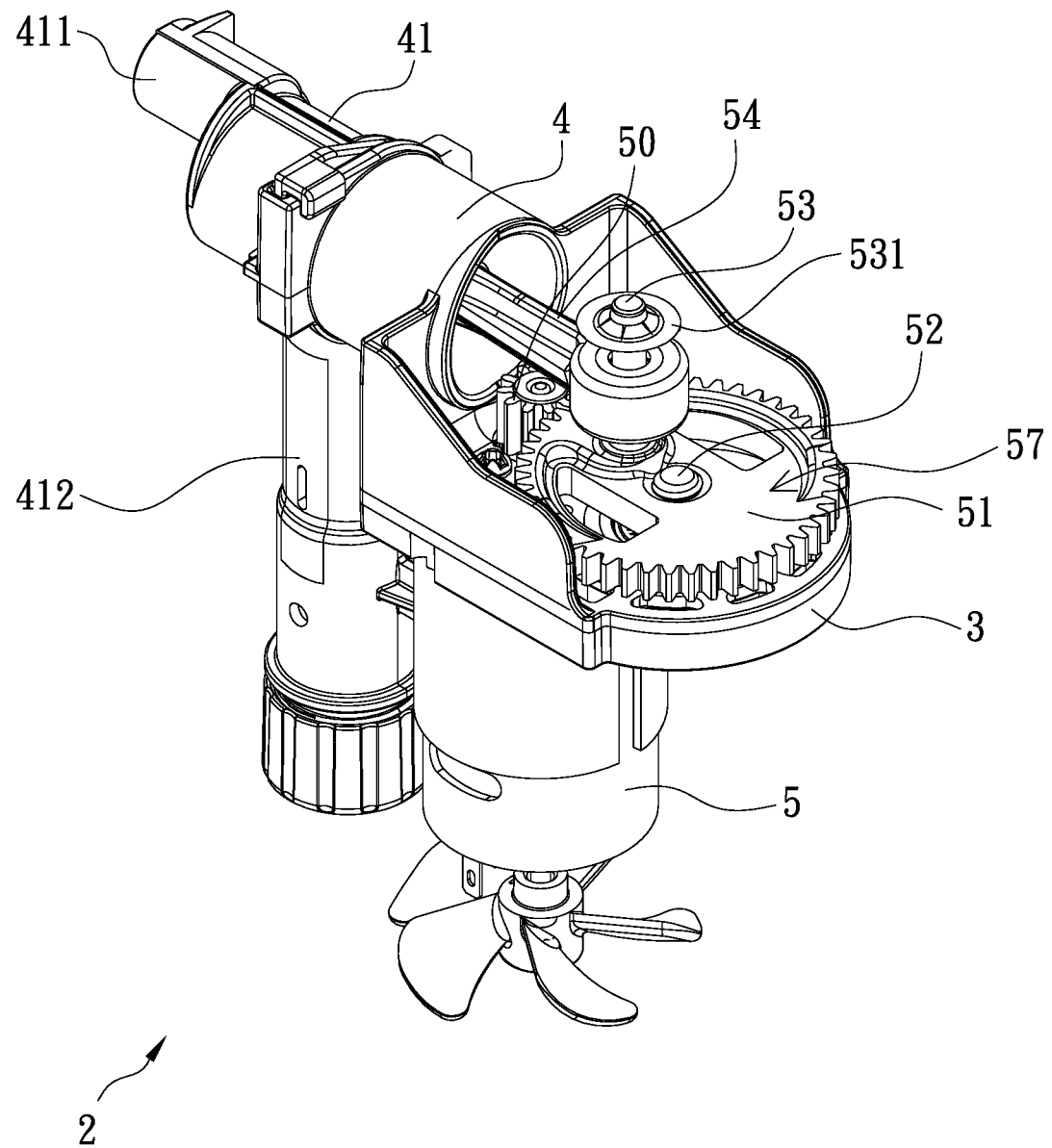
FIG. 1 is a perspective view showing the assembly of an air compressor according to a first embodiment of the present invention.
Figure 2:
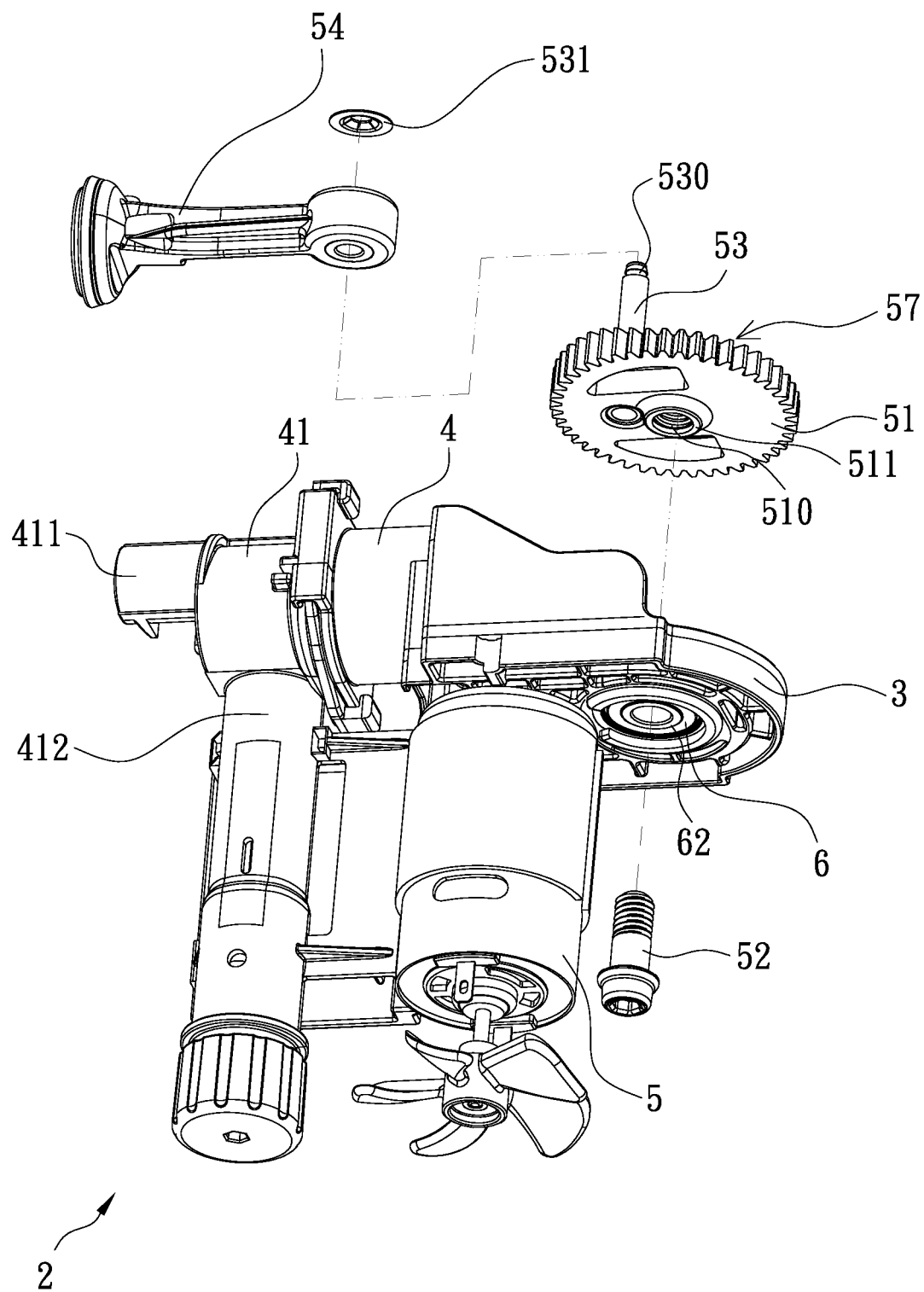
FIG. 2 is a perspective view showing the exploded components of the air compressor according to the first embodiment of the present invention.
Figure 3:
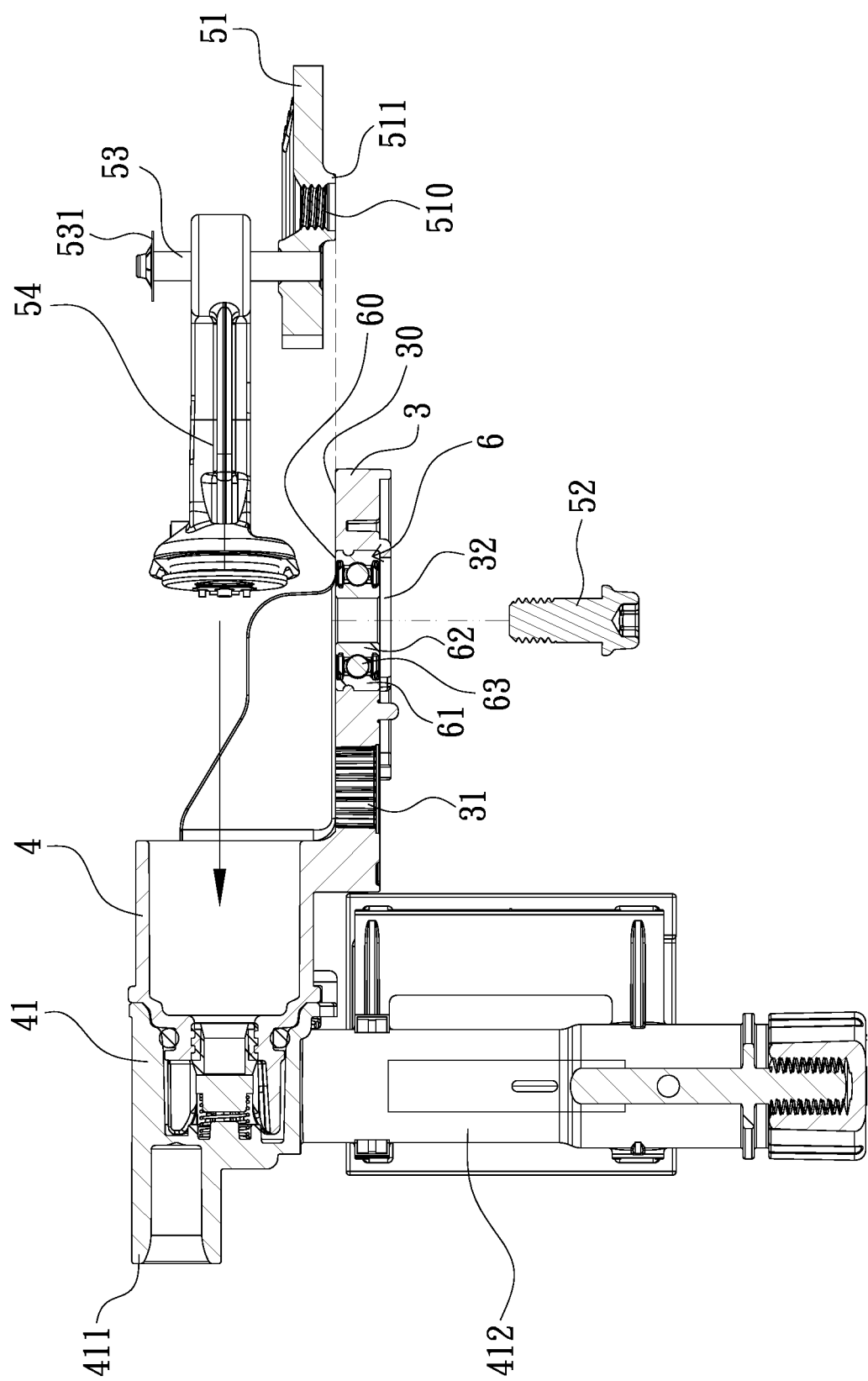
FIG. 3 is a cross sectional view showing the assembly of a part of the air compressor according to the first embodiment of the present invention.

With reference to FIGS. 1-3, an air compressor 2 according to a first embodiment of the present invention comprises: a base 3, a cylinder 4 connected on the base 3, a motor 5 and a transmission mechanism which are both connected on the base 3.

The base 3 includes multiple positioning orifices which are a first positioning orifice 31 and a second positioning orifice 32, a drive gear 50 inserted through the first positioning orifice 31 and mounted on a center of an end of the motor 5, and a bearing 6 accommodated in the second positioning orifice 32, wherein the bearing 6 is comprised of an external ring 61, an internal ring 62, and multiple balls 63 defined between the internal ring 62 and the external ring 61.

The cylinder 4 is one-piece formed or is connected on the base 3, and the cylinder 4 includes an air storage seat 41 communicating thereon, wherein the air storage seat 41 has a delivery tube 411 configured to deliver air, and the air storage seat 41 has a pressure gauge 412.

The transmission mechanism drives a piston 54 to reciprocately move in the cylinder 4, thus compressing the air. The transmission mechanism includes a torque gear 57 and a central orifice 510 defined on the torque gear 57, wherein the central orifice 510 has screw threads formed therein, and the transmission mechanism further includes a connection rod 53 extending from the torque gear 57, wherein the connection rod 53 has a notch 530 defined around a distal end of the connection rod 53.

Figure 4:
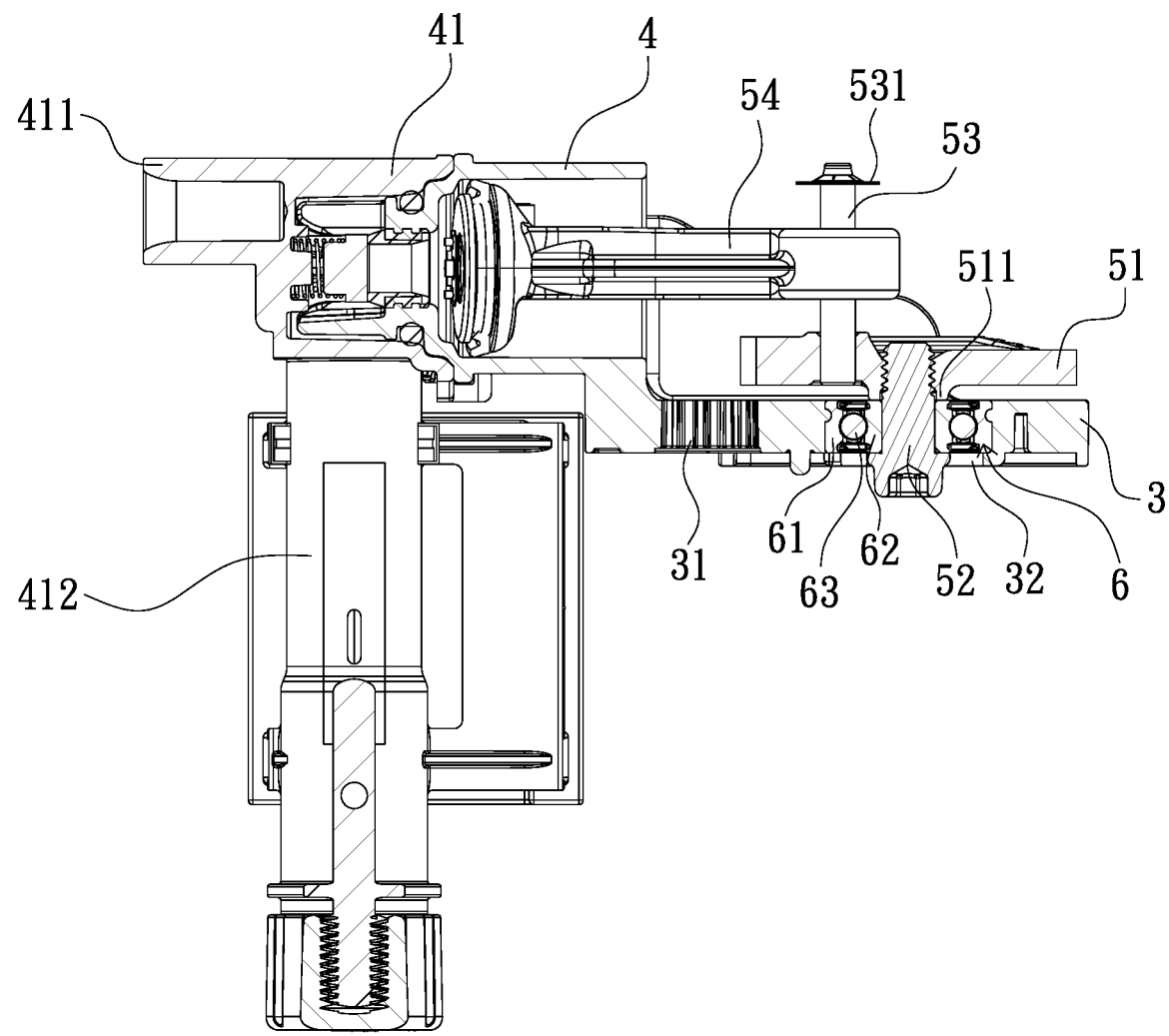
FIG. 4 is a cross sectional view showing the assembly of the air compressor according to the first embodiment of the present invention.

Referring to FIGS. 2-4, the piston 54 is rotatably connected with the connection rod 53 of the torque gear 57, the piston 54 is accommodated into the central orifice 510 of the torque gear 57 and corresponding to the internal ring 62 of the bearing 6 in the second positioning orifice 32 of the base 3, and a screw bolt 52 is screwed with the central orifice 510 after being inserted through the internal ring 62 of the bearing 6 and the torque gear 57, thus connecting the transmission mechanism automatedly.

After the piston 54 is rotatably connected with the connection rod 53 of the torque gear 57, a locking ring 531 is retained in the notch 530 of the connection rod 53 so as to avoid a removal of the piston 54 from the torque gear 57.

The torque gear 57 further has a counterweight portion and a toothed portion 51, wherein the counterweight portion and the toothed portion 51 are one-piece formed in a powder metallurgy manner or are removably connected together, and the toothed portion 51 meshes with the drive dear 50.

Figure 5:
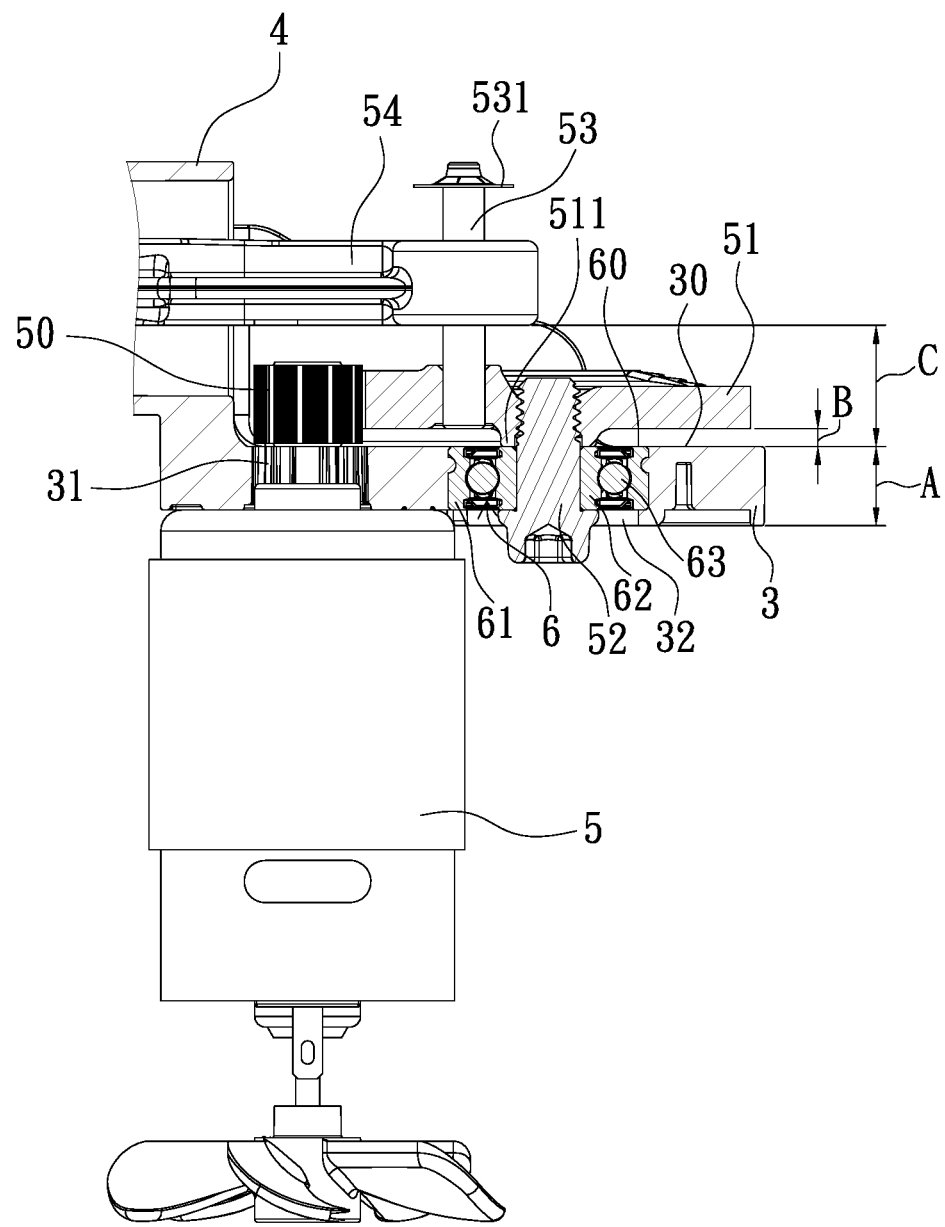
FIG. 5 is a cross sectional view showing the assembly of a part of the air compressor according to the first embodiment of the present invention.

As shown in FIG. 5, an upper surface 30 of the base 3 flushes with a top 60 of the bearing 6, a thickness of the base 3 is a first distance A, a spacing between the upper surface 30 of the base 3 and the toothed portion 51 of the torque gear 57 is a second distance B, wherein the second distance B is more than zero, a spacing between the piston 54 and the top 60 of the bearing 6 is a third distance C. Since the second distance B is more than zero, the toothed portion 51 does not friction with the upper surface 30 of the base 3 when the torque gear 57 rotates.

Figure 6:
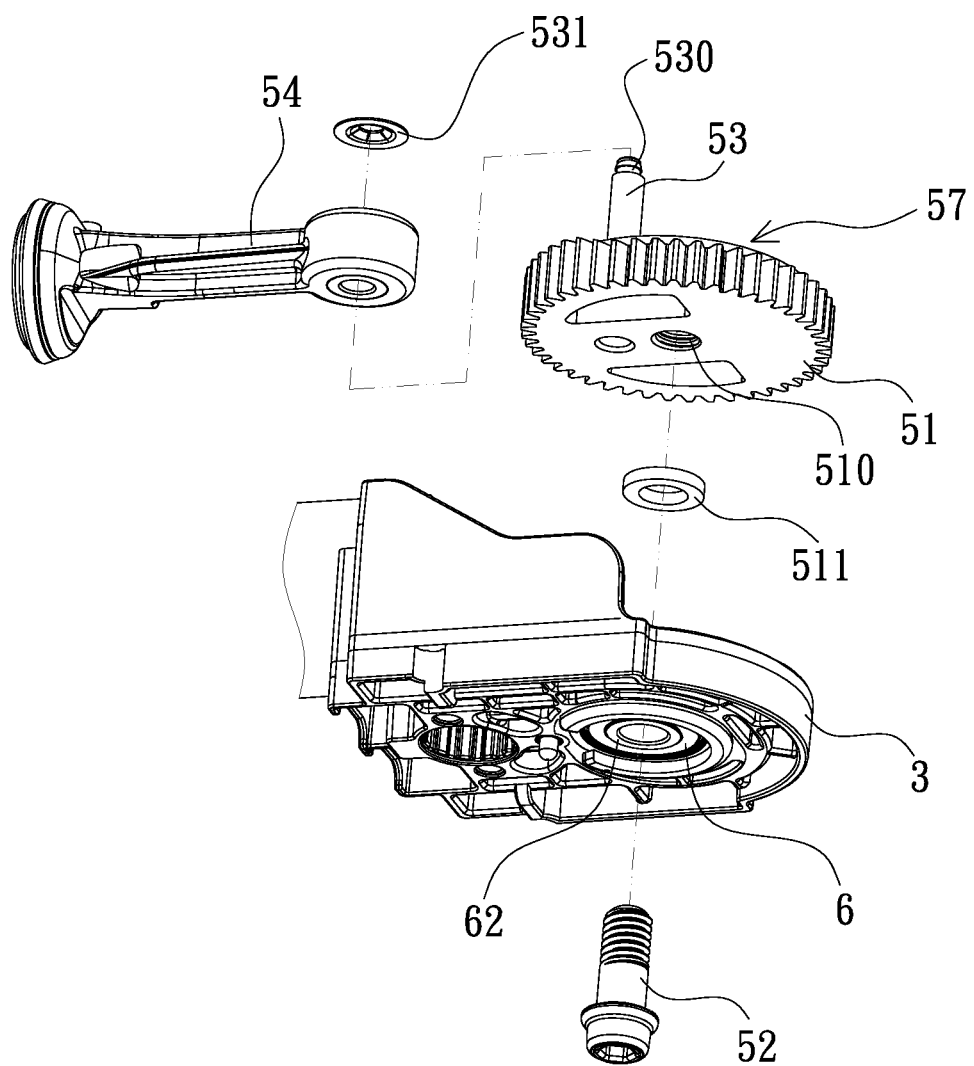
FIG. 6 is a perspective view showing the exploded components of a part of an air compressor according to a second embodiment of the present invention.

The central orifice 510 of the torque gear 57 is defined in the toothed portion 51 so that the second distance B is more than zero. As illustrated in FIGS. 2-5, the toothed portion 51 has a surrounding element 511 extending around a peripheral side of the central orifice 510 and one-pieces formed with the toothed portion 51. As shown in FIG. 6, in a second embodiment, the surrounding element 511 is removably connected on a bottom of the torque gear 57, and the screw bot 52 is screwed with the central orifice 510 after being inserted through the internal ring 62 of the bearing 6, the surrounding element 511, and the torque gear 57.

Figure 7:
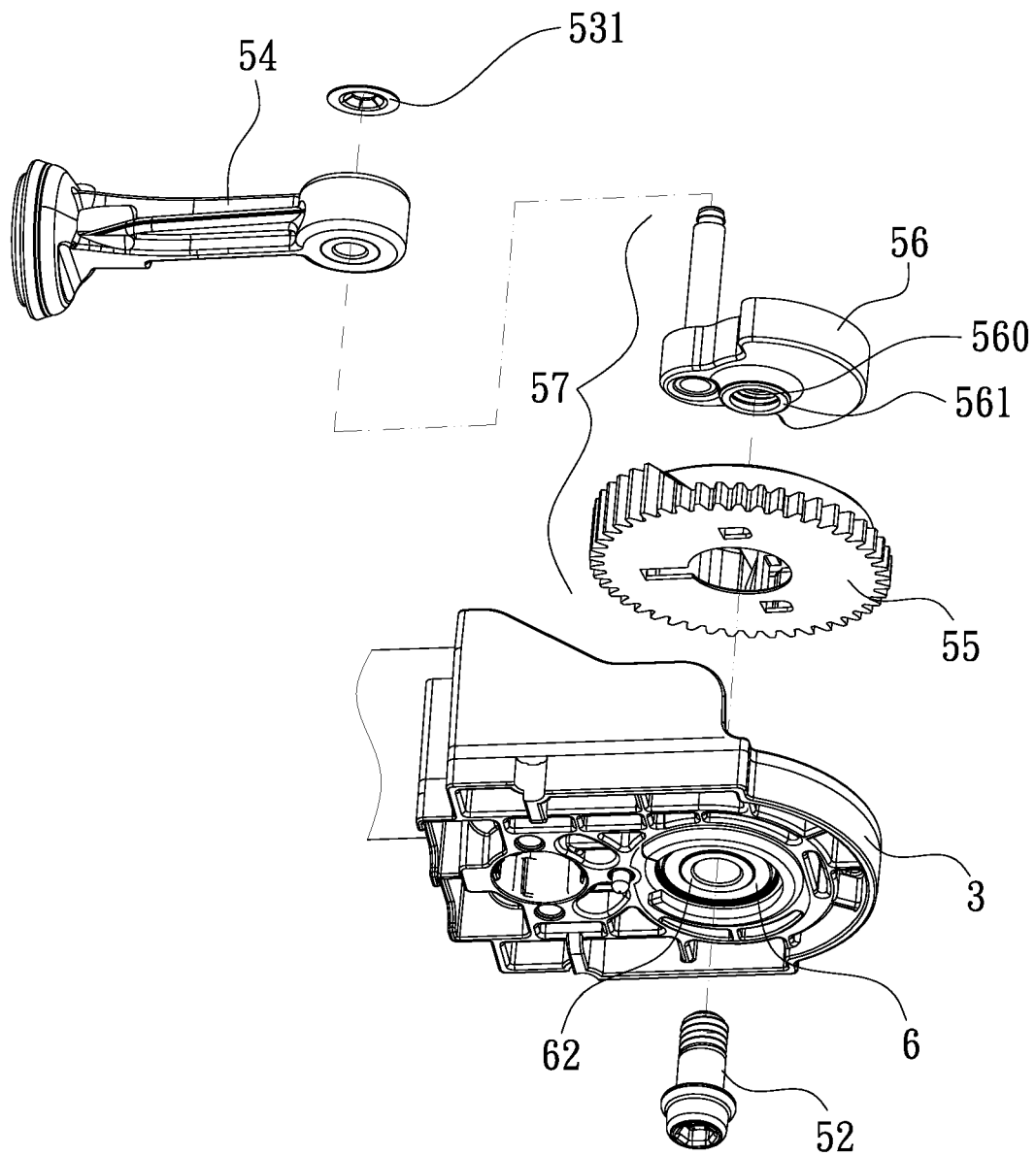
FIG. 7 is a perspective view showing the exploded components of a part of an air compressor according to a third embodiment of the present invention.
Figure 8:
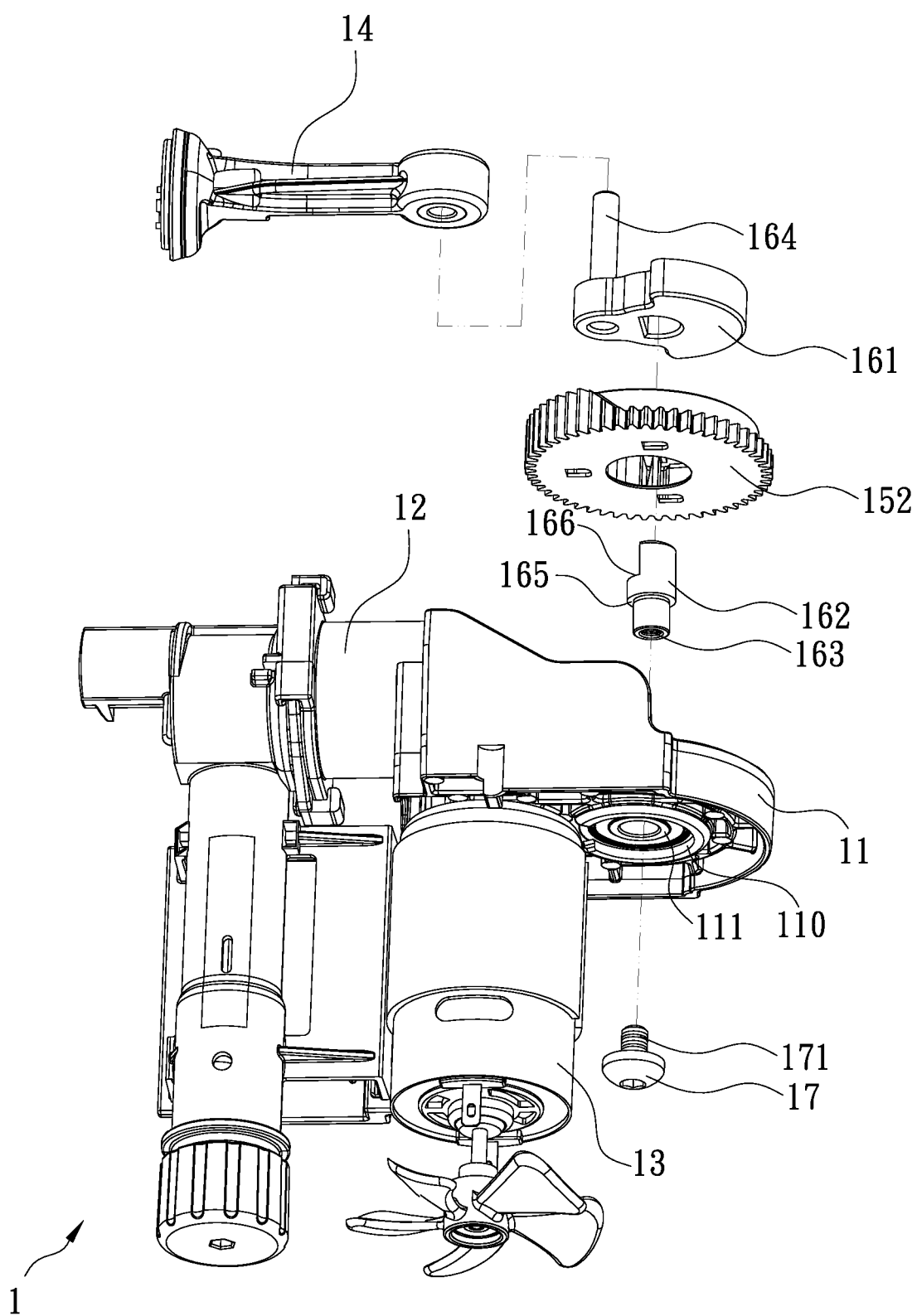
FIG. 8 is a perspective view of a conventional air compressor.
Figure 9:
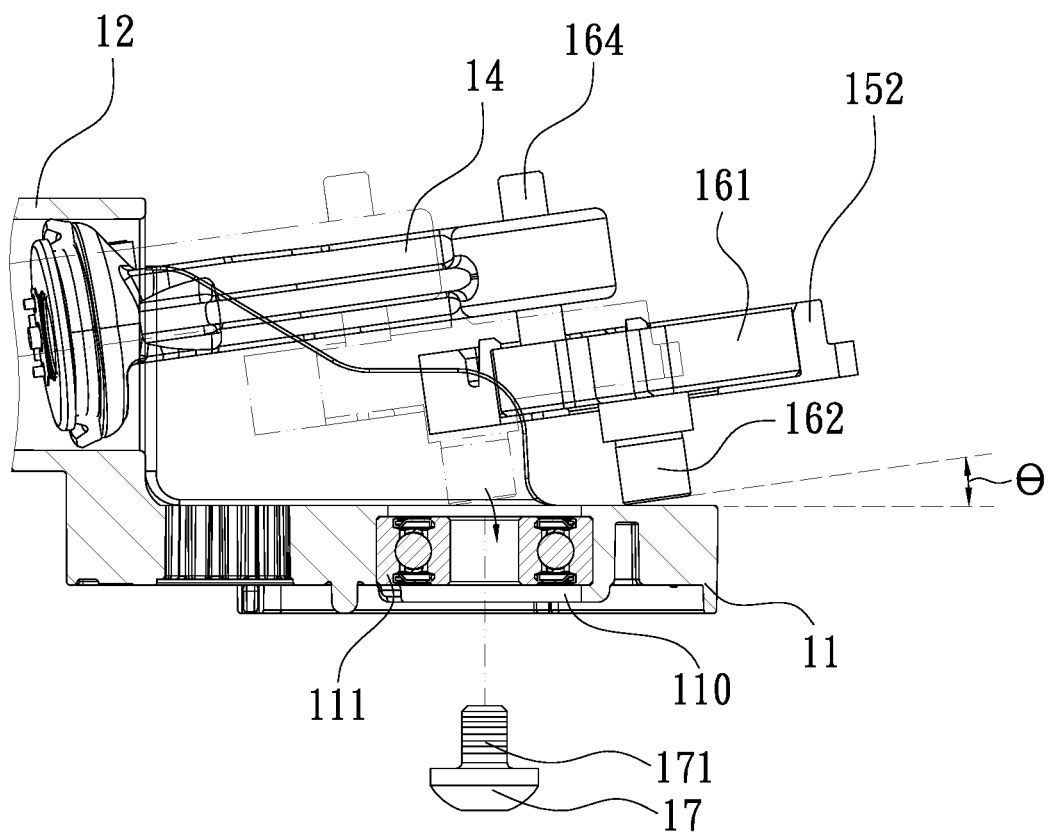
FIG. 9 is a cross sectional view of the conventional air compressor.
Figure 10:
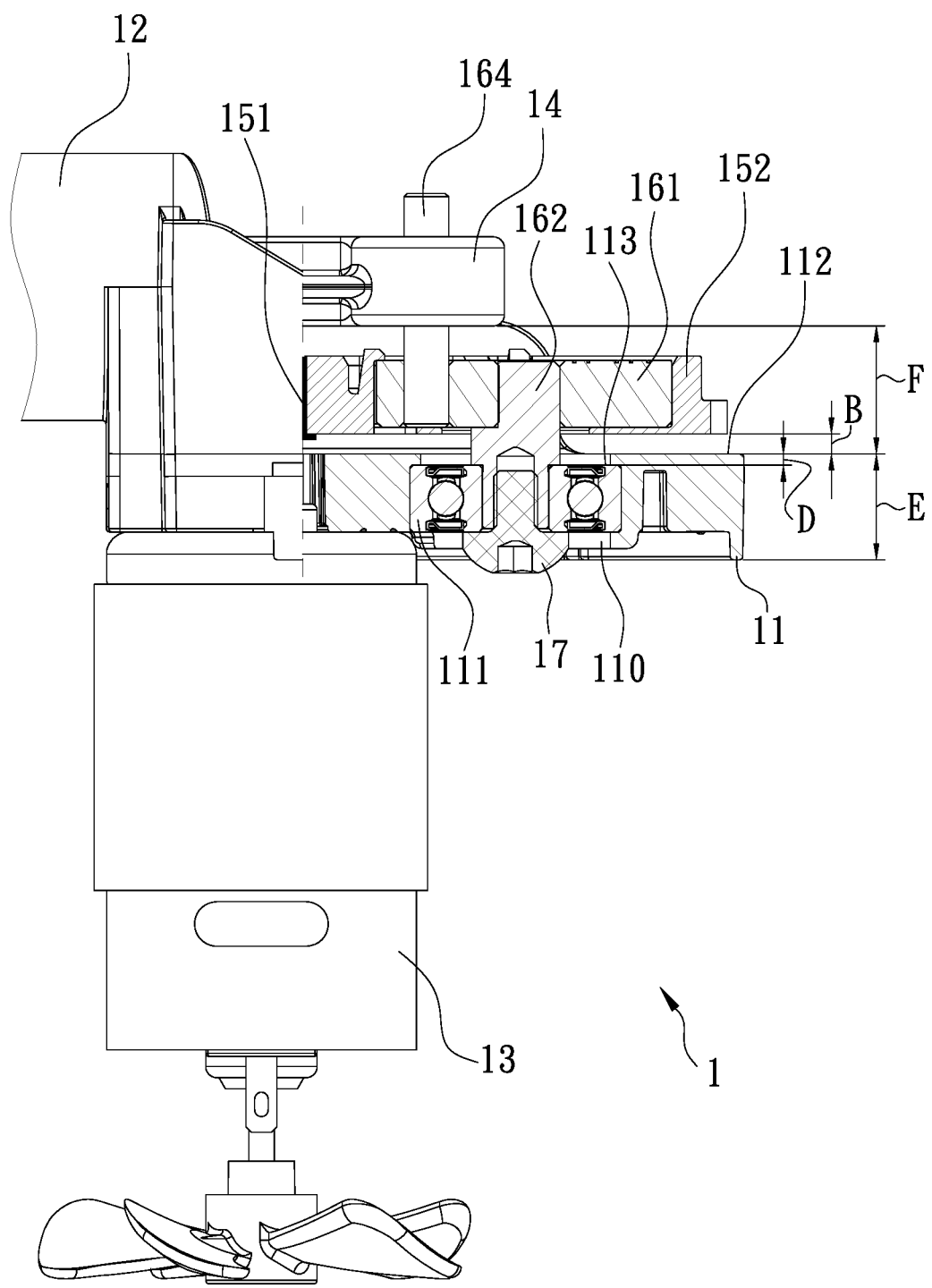
FIG. 10 is another cross sectional view of the conventional air compressor.

With reference to FIG. 7, in a third embodiment, the central orifice 560 of the torque gear 57 is defined on a counterweight portion 56 which is connected on a toothed portion 55, wherein the counterweight portion 56 has a surrounding element 561 extending around the peripheral side of the central orifice 560 and on a bottom of the counterweight portion 56, and the surrounding element 561 is one-piece formed with the counterweight portion 56.

When the air compressor 2 operates, the torque gear 57 engages with the bearing 6 by using the screw bolt 52 so that the bearing 6 is not removed from the screw bolt 52, and the piston 54 moves in the cylinder 4 reciprocately.

Thereby, the central orifice 510 is defined on the torque gear 57 and has the screw threads formed in the central orifice 510, the connection rod 53 extends from the torque gear 57, wherein the central orifice 510 of the torque gear 57 corresponds to the bearing 6 in the second positioning orifice 32 of the base 3, and the screw bolt 52 is screwed with the central orifice 510 after being inserted through the bearing 6 and the torque gear 57, thus connecting the transmission mechanism automatedly. The connection rod 53 of the torque gear 57 is rotatably connected with the piston 54 so that the piston 54 moves in the cylinder 4 reciprocately to compress the air, and the torque gear 57 engages with the bearing 6 by using the screw bolt 52 so that the bearing 6 is not removed from the screw bolt 52, when the torque gear 57 rotates.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention

What is claimed is:

1. An air compressor comprising:
a base including a first positioning orifice and a second positioning orifice, the second positioning orifice accommodating a bearing, a drive gear mounted on a motor extending through the first positioning orifice, the first positioning orifice and the second positioning orifice coplanar in the base;
a cylinder connected to the base and including an air storage seat communicating with the cylinder; and
a transmission mechanism driving a piston to reciprocatingly move in the cylinder;
wherein the transmission mechanism includes a torque gear, a central orifice defined in the torque gear, and the transmission mechanism further includes a connection rod extending from the torque gear, wherein the central orifice has screw threads defined therein, and the central orifice of the torque gear corresponds to the bearing, and a screw bolt is screwed with the central orifice after being inserted through the bearing and the torque gear;
wherein the connection rod of the torque gear is rotatably connected with the piston;
wherein an upper surface of the base is flush with a top of the bearing, a spacing between the upper surface of the base and a toothed portion of the torque gear being a distance which is greater than zero such that the toothed portion is spaced from the upper surface of the base when the torque gear rotates; and wherein a surrounding element extends from a side of the torque gear around the central orifice to space the toothed portion of the torque gear from the upper surface of the base.

2. The air compressor, as claimed in claim 1, wherein the the bearing comprises an external ring, an internal ring, and multiple balls defined between the internal ring and the external ring.

3. The air compressor, as claimed in claim 1, wherein the torque gear further comprises a counterweight portion, the counterweight portion and the toothed portion integrally formed, and the toothed portion meshes with the drive gear.

4. The aft compressor, as claimed in claim 1, wherein the torque gear further comprises a counterweight portion, the counterweight portion and the toothed portion are removably connected together, and the toothed portion meshes with the drive gear.

5. The air compressor, as claimed in claim 3, wherein the surrounding element of the torque gear is integrally formed with the toothed portion.

6. The air compressor, as claimed in claim 1, wherein the surrounding element is removably connected to the torque gear, and the screw bolt is screwed with the central orifice after being inserted through the bearing, the surrounding element, and the torque gear.

7. The air compressor, as claimed in claim 4, wherein the central orifice of the torque gear is defined in the counterweight portion, wherein the counterweight portion comprises the surrounding element, and the surrounding element is integrally formed with the counterweight portion.

8. The air compressor, as claimed in claim 1, wherein the piston is rotatably connected with the connection rod of the torque gear, and a locking ring is retained in a notch of the connection rod so as to a prevent decoupling of the piston from the torque gear.

* * * * *